United States Patent [19]

Hickey et al.

[11] 4,103,546
[45] Aug. 1, 1978

[54] TENNIS RACQUET STRING TENSION GAUGE

[76] Inventors: Robert Hickey, 1725 N. 16th Ave., Hollywood, Fla. 33020; Erik Fahnoe, 655 Jeffrey St. #103, Boca Raton, Fla. 33432

[21] Appl. No.: 725,666

[22] Filed: Sep. 22, 1976

[51] Int. Cl.² .............................................. G01L 5/06
[52] U.S. Cl. .................................................... 73/145
[58] Field of Search .......................... 73/145, 144, 143

[56] References Cited

U.S. PATENT DOCUMENTS 3,391,574   7/1968   Howard ................................. 73/144

FOREIGN PATENT DOCUMENTS 652,262   12/1964   Belgium ..................................... 73/144

Primary Examiner—Anthony V. Ciarlante
Attorney, Agent, or Firm—Burns, Doane, Swecker & Mathis

[57] ABSTRACT

An inexpensive, accurate and portable gauge is disclosed for measuring the tension in the strings of a tennis racquet after it has been strung. The gauge includes a rigid frame supported across the head and an upper spring housing affixed to the frame and projecting toward the racquet face. A lower spring housing telescopically engages the upper housing which includes a pressure plate on its lower end for engaging a number of strings on the racquet face. A spring is disposed inside the upper and lower housings for biasing the pressure plate against the strings and an indicator on the upper and lower housings is calibrated to measure the force exerted by the tennis racquet strings on the spring by means of the pressure plate and thereby to provide an indication of the tension in the strings of the racquet.

5 Claims, 6 Drawing Figures

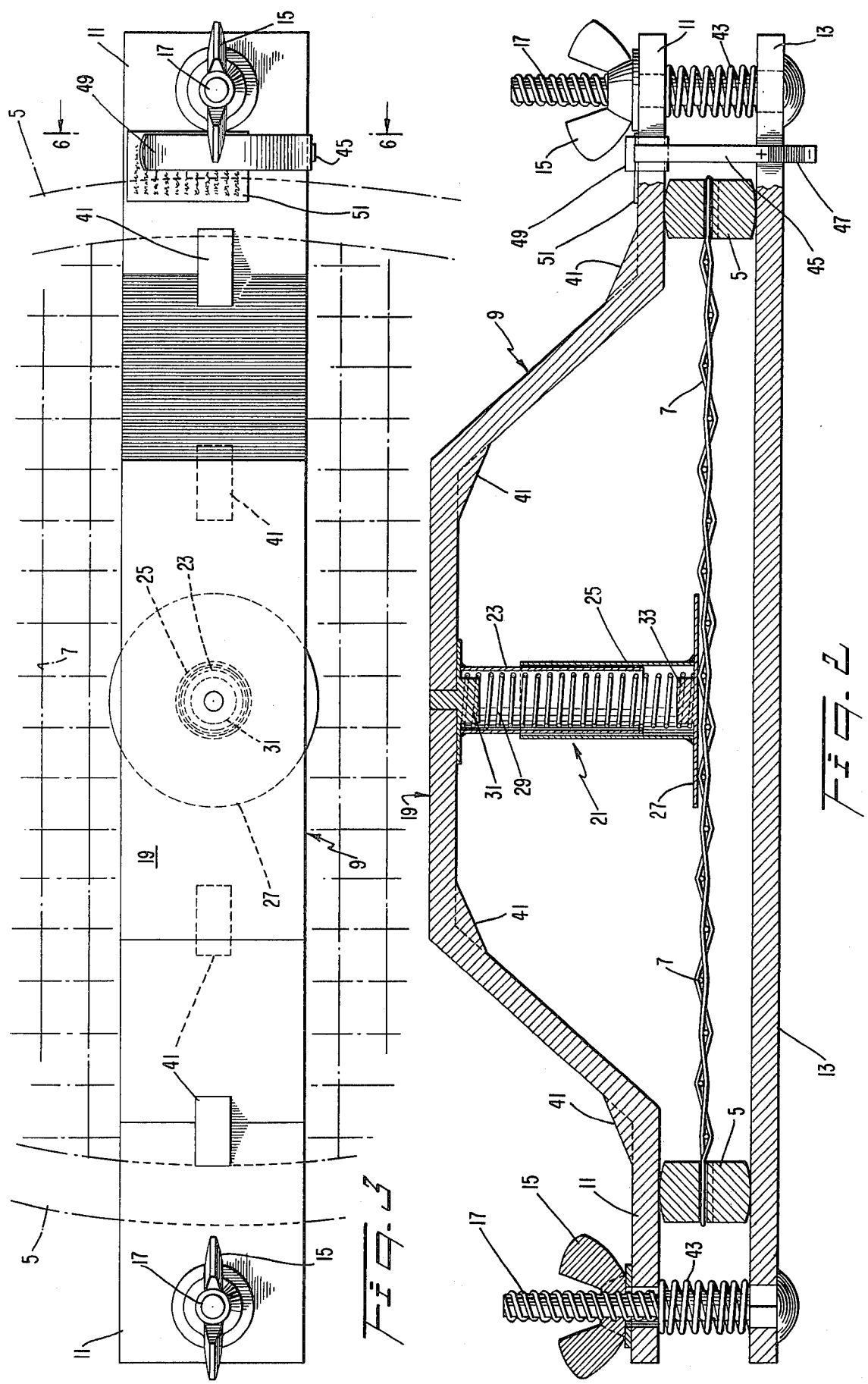

TENNIS RACQUET STRING TENSION GAUGE

BACKGROUND OF THE INVENTION

The present invention relates to measuring instruments, and more particularly to apparatus for determining the string tension of a tennis racquet after it has been strung.

The tension in the strings of a tennis racquet is an important factor in determining the accuracy and speed with which a player may stroke a tennis ball. Players take a great deal of care to insure that their racquets are strung with a proper material and that the material is properly tensioned to their personal specifications best suited to their individual style of play. There exists a number of devices which are well suited to initially string a racquet to the personal specifications of even the most demanding tennis player. However, the tension will often dissipate after a period of use or even during storage. The materials with which tennis racquets are strung are affected by changes in humidity and temperature. For instance, catgut and to a lesser extent even nylon stretch when exposed to high humidity or high temperature. In damp climates the tension can change significantly in the matter of a few hours. Most players rely merely on the feel of the racquet to determine whether the string tension has deteriorated to a point where the player must adjust his stroke or even have the racquet restrung. There is, therefore, the need for an inexpensive, accurate and portable apparatus for measuring the string tension in a tennis racquet.

In the past a number of devices have been provided to enable a player to measure the tension of a single string of a tennis racquet. Such devices are shown in U.S. Pat. No. 3,831,442 to Cummins and U.S. Pat. No. 3,384,225 to Burchett. These devices merely clip on to a single string of the tennis racquet and measure the tension in that string by deflecting it between cooperating surfaces of the measuring apparatus. Although these devices provide useful measurement of string tension, they have limited accuracy because they measure the tension of only one string. Furthermore, the individual string which is being measured and, in fact, the whole tennis racquet face is apt to move during a measurement and further limit the accuracy of these devices. It is also possible that a string whose tension is being measured by one of these devices could break thus requiring the complete restringing of the racquet.

There is a need for an inexpensive, accurate and completely portable device for measuring the string tension of a tennis racquet after it is strung without the disadvantages of the prior art devices.

SUMMARY OF THE INVENTION

The present invention provides a means for measuring the string tension of a tennis, squash or other strung racquet without the disadvantages of prior art devices. The device includes a two part frame having an upper and lower arm that are greater in length than the central portion of the racquet head. An adjustable clamp cooperates with the arms at the ends of the frame to clamp the frame securely on the racquet head. The upper arm has an intermediate portion between its two ends which is spaced apart from the axis passing through the two ends. This intermediate portion is therefore spaced apart from the racquet strings when the head is clamped into the frame and it supports a tension gauge housing. The housing includes an upper tubular section fixed to the upper frame arm and lower tubular section telescoped on the upper section. The bottom of the lower tubular section includes a pressure plate which is biased against the strings of the racquet by means of a compressed spring disposed inside the telescoping tubular members. The plate is preferably circular with a diameter of at least (2 inches) so that it covers at least four transverse and four longitudinal racquet strings at the center crosswork of the racquet. A cooperating scale and cursor disposed respectively on the two tubes provide a means of measuring the tension on the racquet strings.

One may use the string tension gauge of the present invention by placing the racquet head between the upper and lower arms of the frame with the pressure plate located on the center crosswork of the racquet face. As the adjustable clamps are tightened onto the racquet head, the two telescoping members of the gauge housing move together compressing the spring. When the clamps are fully tightened, the cooperative scale and hairline located on the respective telescoping members provide a measurement of the tension in the tennis racquet strings

BRIEF DESCRIPTION OF THE DRAWINGS

A preferred embodiment of the invention is illustrated in the accompanying drawings wherein:

FIG. 2 is a detailed plan view of a portion racquet and gauge shown in FIG. 1;

FIG. 3 is a detailed elevational view of a portion of the gauge shown in FIG. 2;

DESCRIPTION OF THE PREFERRED EMBODIMENT

Figure 1:
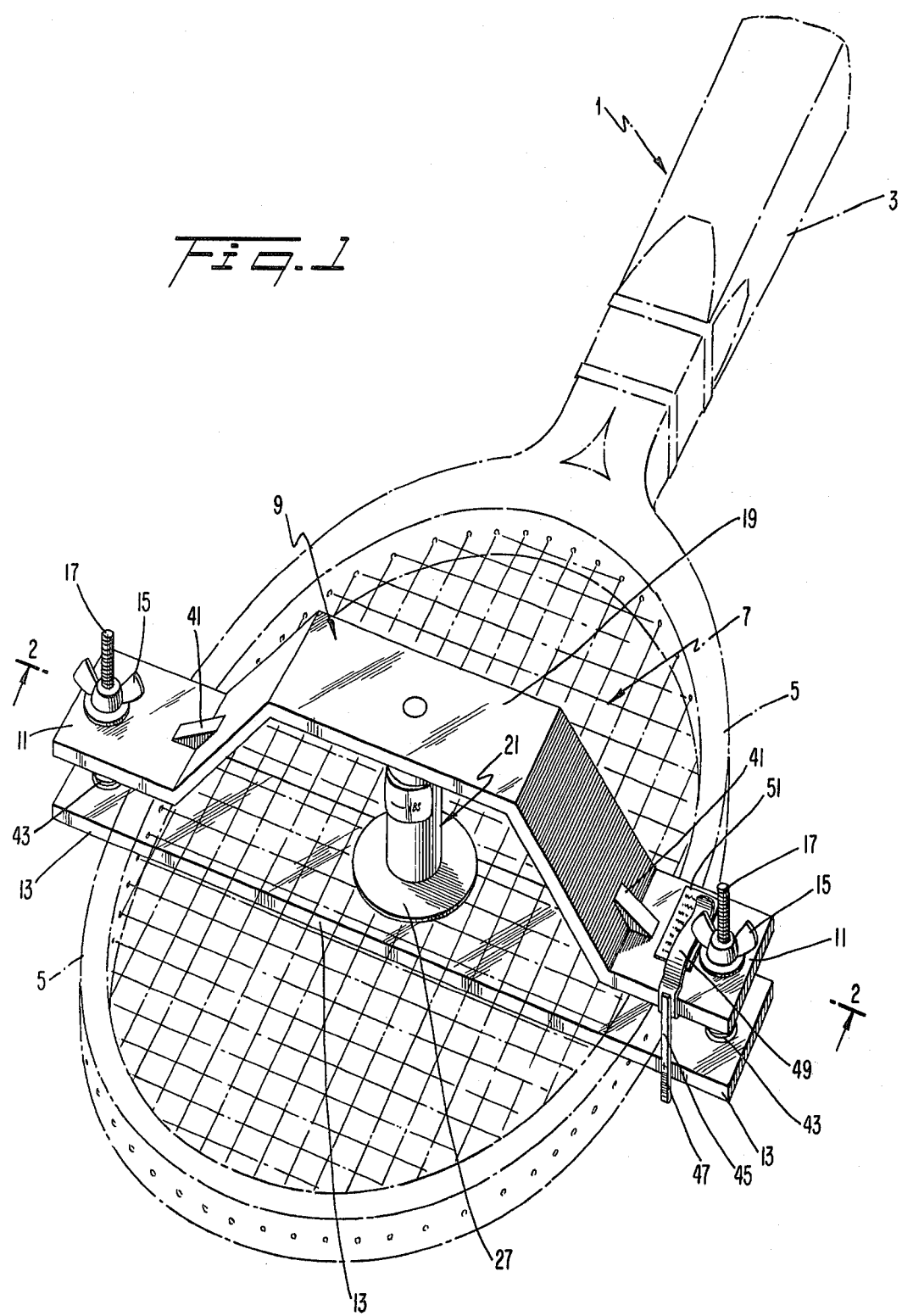
FIG. 1 is a perspective view of a tennis racquet with the string tension gauge of the present invention clamped onto the head in position to measure the tension of the tennis racquet strings.

In FIG. 1 there is shown a tennis racquet 1 having a handle 3 and a head frame 5 and a racquet face 7 made up of a crosswork of tennis racquet strings.

The spring tension gauge 9 of the present invention is shown clamped across a central portion of head 5 including an upper arm 11 disposed transversely across one side of the racquet head, and lower arm 13 disposed transversely across the other side of the racquet head held together by locking wing nuts 15 and their cooperating bolts 17. Upper arm 11 has an intermediate portion 19 between its ends which is spaced above an axis passing through the ends of upper arm 11 and is, therefore, spaced above the surface of the racquet face 7 and supports a tension gauge housing 21 against the surface of the racquet face.

Referring now to FIG. 2 it can be seen that the tension gauge housing 21 includes an upper tubular section 23 affixed to intermediate portion 19 of upper arm 11 and the lower tubular section 25 telescoped over the end of upper tubular section 23. A pressure plate 27 is affixed to the bottom end of tubular section 25 and is biased against the face of the tennis racquet by means of a tension spring 29. Plate 27 is preferably circular with a diameter of at least (2 inches) so that it covers at least four transverse and four longitudinal racquet strings at the center crosswork of the racquet. Screws 31 and 33 fix spring 29 to upper arm 11 and pressure plate 27, respectively, to keep lower tubular section 25 from falling off upper tubular section 23 when the tension gauge is not in use.

Figure 4:
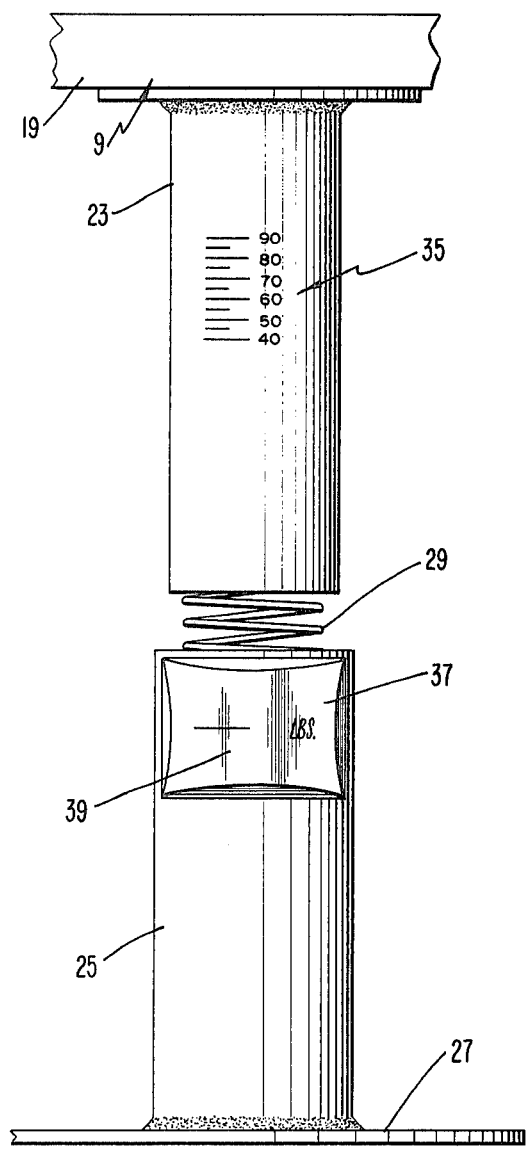
FIG. 4 is a detailed elevation showing parts of the gauge housing extended.
Figure 5:
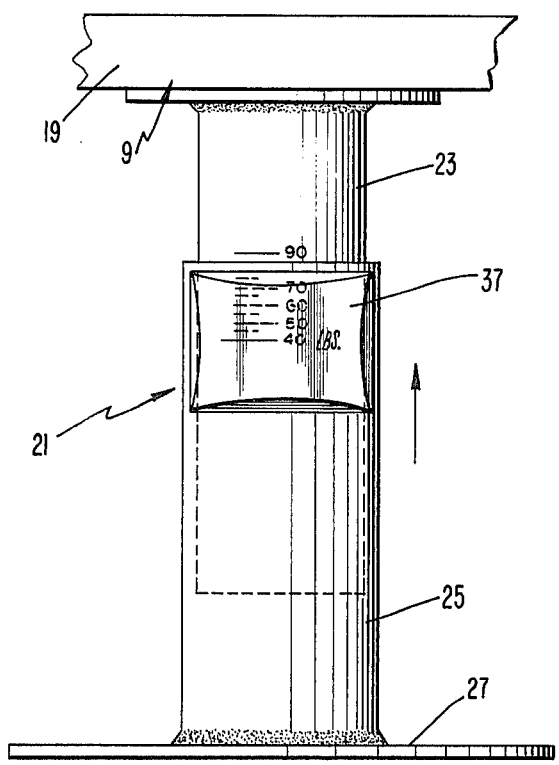
FIG. 5 is a detailed elevation showing parts of the gauge housing in position for measuring string tension of the racquet strings; and, FIG. 6 is a detailed view shown partially in section of the thickness guide.
Figure 6:
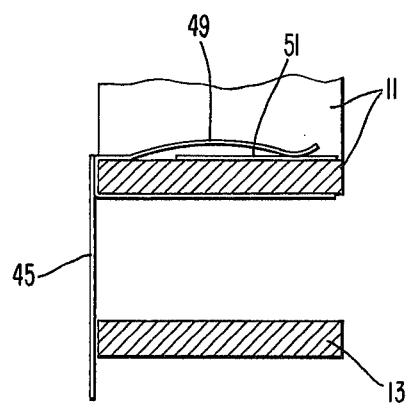

As shown in FIGS. 4, 5 and 6, a cooperating scale 35 and cursor 37 with an indicating hairline 39 are disposed, respectively, on upper tube 23 and lower tube 25. Scale 35 is properly calibrated with spring 29 to provide an indication of string tension in the tennis racquet face. Cursor 37 may be made of glass or plastic and is disposed in an opening in the wall of lower tubular section 25 so that scale 35 may be read. The cursor glass or plastic preferably provides eight power magnification to provide easier reading of the scale 35.

Upper arm 11 and lower arm 13 have a generally rectangular cross section with its longer dimension resting on a racquet head 5 to provide a stable base for frame 9 and to prevent it from moving while a measurement is being taken. The frame is preferably made of steel or cast iron to provide a rigid base. Further rigidity is provided by support webs 41 disposed at the corners of upper arm 11. Alternatively upper arm 11 may be dome shaped.

The tension gauge housing is preferably made of plastic to minimize the weight of the housing and thereby to minimize any inaccuracies in the spring tension measurement which would be caused by excessive extra weight resting on the tennis racquet face. Pressure plate 27 is preferably made of steel so that it will not deform during the measurement. Bolt springs 43 may be provided around bolts 17 to bias upper arm 11 away from lower arm 13 to permit easy insertion of a tennis racquet head 5 into frame 9.

The string tension gauge of the present invention also provides a means for adjusting the calibration of the gauge to accommodate tennis racquets of different head frame thickness. It is apparent from the drawing of FIG. 1 that if the thickness of head 5 is changed, the calibration of the scale would be altered. To provide for this alteration, the present invention includes a thickness adjusting guide 45 mounted onto one end of upper arm 11 outside head 5 by means of spring clamp 49 to which it is attached. Guide 45 is made of a thin strip of metal which projects toward lower arm 13 and is aligned with an edge of lower arm 13. The lower end of guide 45 includes a scale 47 calibrated for different thicknesses of racquet head. The edge of lower arm 13 cooperates with scale 47 on guide 45 to provide a reading index. If the edge of lower arm 13 is aligned with the number (−)2 on the scale, then the tension gauge scale is adjusted by adding 20 lbs. to the reading. Similarly, for a line (−)4 add 40 lbs. to the reading and for a line (+)3 deduct 30 lbs. from the reading, and so on. Spring clamp 49 may also be used to attach a conversion table 51 to the upper arm 11 where it may be easily read. This guide is removable because most users would use it only to obtain the correct reading for their racquet and then remove the guide 45, clamp 49 and conversion table 51.

In operation, the string tension of a tennis racquet is measured by inserting head 5 of tennis racquet 1 between upper arm 11 and lower arm 13 of frame 9 and aligning frame 9 so that pressure plate 27 engages a center crosswork of the tennis racquet face. As wing nuts 15 are tightened down tubular members 23 and 25 move together compressing spring 29 through the action of the tennis racquet strings against the surface of pressure plate 27. When wing nuts 15 are completely tightened down frame 9 is clamped around head 5 and the hairline on cursor 37 may be used to read the string tension directly from scale 35. Suitable corrections to this spring tension may be made for different thickness racquet heads 5 by means of thickness guide 45.

It may be seen that the present invention provides an accurate, inexpensive and completely portable means for measuring string tension of a tennis racquet. The present invention measures string tension in a way that is more compatible with racquet performance. Rather than measuring the tension by pinching or twisting a single strand, it measures tension by deflecting the racquet strings in the same way that a ball deflects racquet strings upon impact and thereby provides measurements which are more pertinent to racquet performance. The possibility of damage to an individual string is minimized because the pressure plate is applied to a number of strings and therefore does not overstress any particular string. Because frame 9 is tightly clamped onto head 5, the present invention avoids inaccuracies in tension measurement which may be caused by unwanted movements of prior art tension gauges while a measurement is being taken.

Although only a preferred embodiment has been shown and described, it is to be understood that the foregoing disclosure is given as an example only rather than by way of limitation, and that without departing from the invention, the details may be varied within the scope of the appended claims.

We claim:

1. A guage for measuring the tension in the strings of a tennis racquet head comprising:
    a rigid frame including
        an upper arm having opposite end portions and an intermediate portion;
        end portions lying in the same plane surface and said intermediate portion being spaced from a planar surface parallel to the planar surface of said end portions
        a lower arm;
    attachment means including means disposed on the opposite ends of the frame for clamping said upper and lower arms about the head of a tennis racquet for releasably securing said frame across said head;
    a first spring housing on said frame projecting toward a racquet face;
    a second housing telescopically received in said first housing and including a pressure plate in position for engaging a plurality of strings of the racquet face;
    a spring disposed inside said first and second housings for biasing said housings axially apart from each other;
    means on said housing for indicating the force exerted by said tennis racquet strings on said spring by means of said pressure plate and thereby providing an indication of the tension in the strings of the racquet; and,
    means for correcting the calibration of the gauge to account for head frames of different thicknesses comprising:
        a thickness guide supported from one end of said upper arm projecting toward said lower arm and including a scale on the end thereof aligned with an edge of said lower arm; and, said lower arm edge being cooperative with said scale to provide a correction factor whereby the string tension may be accurately measured for tennis racquets having head frames of different thicknesses.

2. A gauge for measuring the tension in the strings of a tennis racquet head comprising:

a rigid frame including
an upper arm having opposite end portions and an intermediate portion;
said and having a planar surface parallel to the planar surface of said end portions and said intermediate portion being spaced from a lower arm;
attachment means including means disposed on the opposite ends of the frame for clamping said upper and lower arms about the head of a tennis racquet for releasably securing said frame across said head;
a first spring housing on said frame projecting toward a racquet face;
a second housing telescopically received on said first housing and including a pressure plate in position for engaging a plurality of strings of the racquet face;
a spring disposed inside said first and second housings for biasing said housings axially apart from each other; and
means on said housing for indicating the force exerted by said tennis racquet strings on said spring by means of said pressure plate and thereby providing an indication of the tension in the strings of the racquet.

3. A gauge according to claim 2 wherein said pressure plate has a flat face and is made of a rigid material and said face has a diameter of at least (2 inches).

4. The gauge according to claim 2 further including means for correcting the calibration of said gauge to account for head frames of different thicknesses.

5. The gauge according to claim 2 wherein said indicating means includes:
a scale disposed on an outer surface of said first housing; and
said second housing includes an opening therein and a transparent magnifying cursor with a hairline thereon, mounted in said opening, said hairline cooperative with said scale to provide a measurement of tennis racquet string tension.

* * * * *